United States Patent Office 3,428,121
Patented Feb. 18, 1969

3,428,121
PERMEABLE CEMENTING COMPOSITION
AND METHOD
Bobby G. Harnsberger, Houston, Tex., assignor to Texaco Inc., and Texaco Development Corporation, New York, N.Y., both corporations of Delaware
No Drawing. Filed Nov. 29, 1966, Ser. No. 597,521
U.S. Cl. 166—276  9 Claims
Int. Cl. E21b 43/02, 33/13; C04b 7/02

ABSTRACT OF THE DISCLOSURE

The invention relates to a method of and composition for the treatment of an incompetent formation penetrated by a well bore to prevent the movement of sand particles from the formation to the well bore during recovery of the formation fluids by forming a slurry of sand, cement and water in a hydrocarbon carrier oil, injecting the slurry into the formation under pressure, permitting the cement to set and form a permeable barrier film between the formation and well bore and recovering fluids from the formation through the formed permeable cement barrier.

---

The present invention relates to the treatment of permeable underground formations. More particularly, the present invention relates to a method of treating permeable underground oil and/or gas containing formations to stabilize the sandy portion thereof and to a treating composition useful in the stabilization of incompetent sand containing underground formations.

The recovery of fluids such as gas and/or oil from underground formations has been found to be troublesome in areas wherein the underground formation is composed of one or more incompetent sand containing layers or zones. The sand particles in the incompetent zone and/or layer tend to move or migrate to the well bore during recovery of the formation fluids from the particular zone and/or layer and frequently the moving sand particles block the passageways leading to the well bore. Plugging or materially impairing the flow of the formation fluid toward the bore hole results in a loss of these fluids to the producer or so decreases the rate of oil recovery from the well as to cause the well to be shut down because it is economically unattractive to continue to produce therefrom. An additional adverse factor resulting from the movement of the sand particles toward the well bore is that they are often carried along with the formation fluids to the well bore and passed through the pipes, pumps, etc. being used to recover the formation fluids to the surface with resulting damage to the moving parts thereof as the said particles are very abrasive.

Many attempts have been made heretofore to prevent or decrease the flow of undesireable sand particles in the formation and/or in the production tubing and associated equipment, such as by the placement of sand screens, filters, liners, and so forth. These prior attempts have been unsuccessful for a number of reasons among which is that these mechanical devices fail to prevent completely the flow of the formation particles into the production equipment. In addition, these devices interfere with various types of completion and workover operations. In recent years the industry has attempted to avoid the difficulties encountered in the use of mechanical devices by employing various chemical compositions to effect consolidation of the underground incompetent formations. These methods have generally consisted of injecting into the underground formation polymerizable resinous materials which when subsequently polymerized consolidate the formation sand to form permeable barriers in the formation to prevent the sand particles from movement therethrough. However, this technique of sand consolidation has not met with widespread acceptance because of the inherent difficulties of effecting polymerization and even distribution of the resinous materials in the formation to a degree sufficient to consolidate these underground formations and yet permitting the unobstructed flow of the desirable formation fluids therethrough. Further, the cost associated with these resin coating methods has been relatively high in comparison with the prior mechanical methods.

By the method of the present invention one is able to treat effectively the underground formation to be stabilized in a rapid and efficient manner while avoiding the disadvantages of these prior art methods both mechanical and chemical.

One object of the present invention is to provide an improved method of treating underground sand containing formations to stabilize the incompetent formation. An additional object is to provide a fluid permeable barrier between the formation sand and the well bore to prevent or to minimize the flow of unconsolidated sand particles therethrough while maximizing the flow of desired fluids, and particularly petroleum hydrocarbons therethrough. A still further object is to provide a novel treating composition for use in stabilizing incompetent sand formations and to a method of placing same to form a permeable cement filter against the incompetent formation.

How these and other objects of the invention are accomplished will become apparent with reference to the accompanying disclosure. In at least one embodiment of the method of this invention at least one of the foregoing objects will be obtained.

It has now been discovered that an improved method of treating an incompetent sand containing underground formation comprises introducing against said formation a particular treating composition consisting essentially of a sand, cement and water slurry dispersed or suspended in a hydrocarbon oil in an amount sufficient to stabilize the formation and to form a fluid permeable barrier between the formation and the well bore. The resultant formed permeable barrier serves to prevent or to materially reduce the flow of the unconsolidated sandy particles therethrough while permitting the flow of desirable formation fluids through the permeable barrier at a substantially unimpaired rate.

More specifically the present invention comprises a method of and composition for the treatment of an incompetent formation penetrated by a well bore to prevent the movement of sand particles from the formation to the well bore during recovery of the formation fluids by forming a slurry of sand, cement and water in a hydrocarbon carrier oil, injecting the slurry into the formation under pressure, permitting the cement to set and form a permeable barrier film between the formation and well bore and recovering fluids from the formation through the formed permeable cement barrier.

In carrying out the method of the present invention the sand-cement slurry suspended in the petroleum hydrocarbon fraction is pumped down the well bore under sufficient pressure to force the slurry of the sand, cement and water against the unconsolidated formation adjacent to or in reasonable proximity to the well bore.

When the permeable cement slurry is in contact with the formation to be stabilized adjacent to the well bore the slurry is permitted to remain in contact with the unconsolidated formation and the cement component of the slurry is permitted to set up and harden. Hardening of the cement can be accelerated or retarded through the use of additives which are known in the art. The bore hole is closed in for an appropriate period of time to permit hardening, e.g. from 8 to 72 hours. Thereafter the well can be equipped for production and the formation fluids can be recovered by passing through the resulting formed permeable cement barrier into the well bore and recovered therefrom without the formation fluids being contaminated with the presence therein of unconsolidated sand particles.

The method of the present invention is adaptable for use in any type of well completion but it is generally used in a well wherein casing has been set and which is equipped with perforations in the casing at the desired intervals where the unconsolidated formation sands are located. Packers can be initially set above and below the perforated intervals to prevent the permeable cement slurry from passing into the non-isolated portions of the well and also to permit build-up of sufficient pressures on the slurry to force same through the perforations and against the formation without plugging up the well bore. After the cement slurry has been forced through the casing perforations and against the formation, the well is shut in to permit the cement to set and form a permeable cement barrier for the unconsolidated sand in the formation.

The cement slurry composition useful in the method of the present invention must meet certain specific requirements. The sand component in general should be closely sized in the broad range 10–80 mesh, i.e. 12–20, 20–40, 40–60 mesh or intermediate meshes, to permit effective relatively high permeability cement barriers being formed. In addition, the ratio of the sand component to the cement component prior to the sand cement slurry being suspended in the hydrocarbon carrier oil should be from about 3 parts to about 12 parts by weight of sand per part of cement. It has been found that a frac sand, i.e. a sand customarily used in formation fracturing operations, having a size of between about 20 to 40 mesh is suitable for use in the cement slurry of the present invention. It is preferred to use a graded sand with the larger grains being not more than about twice the diameter of the smaller grains, i.e. 12–20 mesh, 20–40 mesh, 40–60 mesh, etc.

In general a 20–40 mesh sand is employed as the sand component because of its ready availability and its adaptability for use in stabilizing most formations. In addition the use of a 20–40 mesh sand appears to prevent premature bridging which is likely to be more prevalent with finer mesh sands.

Sand particles which are coarser than about 10 mesh and finer than about 80 mesh are unsuitable for use in the composition of the present invention. The coarser particles are not satisfactory because the resultant set cement barrier has too great a permeability to prevent the flow of very fine unconsolidated sand particles therethrough when the well is placed on production. Very fine sand particles in the slurry of the present invention, that is those sand particles finer than about 80 mesh, are unsuitable because the resultant set cement has too low a permeability to permit the flow of desired formation fluids therethrough.

The cement component of the composition of the present invention should be present in the dry mixture in a ratio of about 1 part of cement to from 3 to about 12 parts by weight of sand on a weight basis. The cement component of the composition of the present invention may be any of the cements normally used in oil well cementing operations as well as plaster of Paris cement, sodium silicate cement, a silico phosphate cement, an acid phosphate cement or a pozzolan cement, a sorel cement or a litharge cement. It is preferred that the cement component be a light weight Portland cement having a density of about 75 lbs. per cubic foot and a chemical analysis approximately as follows: silicon dioxide 38.3%, aluminum oxide 13.0%, ferric oxide 5.2%, calcium oxide 35.7%, magnesium oxide 1.6% and sulfur trioxide 2.4%, with a loss on ignition of approximately 3.3%. This particular light weight Portland cement has been found to be most suitable in the composition of the present invention since permeable cements made from this cement are most stable to attack by formation brines containing sodium chloride or sodium sulfate. Other oil well cements are not as resistant to attack by formation brines or sulfate solutions and therefore are not as practical for use in the cement composition of the present invention. These other elements appear to lose some of their compressive strength and become eroded from contact with sodium chloride and sodium sulfate solutions. In contrast the cements of the composition of the present invention are very resistant to erosion by sodium chloride or sodium sulfate solutions and do not lose their compressive strength even after prolonged exposure thereto.

The water component of the slurry will vary with the type of cement and the sand mesh range. Satisfactory results are obtained with from about 0.7 to about 0.95 part of water per part by weight of cement, when 20–40 mesh sand is used. Excess water may result in the separation of cement laden droplets of water from the sand whereas insufficient water may result in the separation of cement solids from the sand. In either case the formation may be damaged.

It has been found that the use of water containing salts such as sodium and/or calcium chloride are effective in preventing dispersions of the oil with oils containing surface active agents as the carrier medium. Desirably the salt concentration should approach a saturated solution at ambient temperature as the oil neutralization number approaches 1.0. Less than saturated salt solutions are used as the oil neutralization number decreases toward 0.3.

The oil neutralization number represents the amount in milligrams of 1 N potassium hydroxide required to neutralize one gram of the oil. Oils having a neutralization number below about 0.1 have been found to be most satisfactory.

The carrier medium for the sand-cement-water slurry is a hydrocarbon oil. Suitable hydrocarbon oils include the kerosene and diesel oil fractions of a petroleum crude oil as well as crude oil. A diesel oil fraction is normally employed since such a fraction is relatively inexpensive and is usually readily available at or near the treatment site. The oil should be relatively free of surface active materials such as naphthenic acids which may displace water from the sand and cement components. It has been found that the presence of surface active agents such as the naphthenic acids can be tolerated in the oil without adverse effects provided the neutralization number of the oil is not above about 0.3 without using a salt to offset the effect of the surface active agents. Sufficient of the hydrocarbon oil carrier medium is employed to suspend the slurry therein. It has been found that most satisfactory compositions have a slurry density in the range of from 8 to 12 pounds per gallon and the amount of solids suspended or dispersed in the hydrocarbon oil can be in the range of from about 0.5 to 5 lbs. of the slurry (sand, cement and water) per gallon of the hydrocarbon oil carrier medium.

The use of more viscous oils than diesel oil or kerosene fractions or non-viscous crude oils as the carrier medium is to be avoided since the heavier fractions are more difficult to pump down the well bore.

The sand-cement-water slurry can be prepared in the customary manner such as by mixing the components at the surface in a suitable vessel or in a mixing truck. The order of addition of the components of the slurry is not critical.

The hydrocarbon carrier medium containing the suspended solids is pumped down the well bore and into the formation at rates which may vary with well conditions. Generally, a rate of from about 1 to 2 barrels of the suspended solids in the carrier medium per minute is suitable for perforated intervals of 4–10 feet with higher rates being used for longer intervals. Such rates have been found to give the satisfactory results and the resulting permeable cement barrier formed in the unconsolidated formation has a sufficiently high compressive strength and sufficient permeability to permit the flow of formation fluids therethrough while stabilizing or restraining maintaining the formation sands.

EXAMPLE 1

A well was prepared for a field trial by running tubing and a packer and by swabbing the well in. A considerable volume of sand was produced and then the tubing was pulled and the perforations at the 5,138 to 5,142 feet depths were washed in the usual manner by use of a perforated washing tool or by setting a packer at intervals in the perforations and circulating fluid around same. Formation sand was left in the rat hole so that there was about four feet of open hole below the perforations. A packer and 90 feet of tail pipe were set with the tail pipe about 150 feet above the perforations. Diesel oil was was spotted across the perforations and squeezed out in the formation at a rate of about 2 barrels per minute and with a pressure of about 1,500 p.s.i. to establish an injection pressure. In all about 5 barrels of diesel oil was squeezed into the formation.

A treating mixture was prepared in the following manner. A slurry of sand, oil, cement and water was prepared by mixing 3,600 pounds of sand, 675 pounds of cement and 70 gallons of water to wet the cement component of the slurry and then adding to the resultant mixture 165 gallons of a hydrocarbon oil. A second treatment of diesel oil was forced into the formation at a rate of about 2 barrels per minute until several additional barrels of oil had been injected into the formation. Thereafter the cement slurry in oil was pumped into the diesel carrier oil in an amount to give a solids content of about 0.5 to 0.75 pound per gallon diesel carrier oil. The cement slurry in the diesel carrier oil was injected into the formation at a rate of about 2 barrels per minute and at a pressure which increased from about 1500 to about 2400 p.s.i. during injection. It was calculated that approximately 1400 to 1500 pounds of the cement slurry in oil were injected into the formation. The final injection pressure was 3000 p.s.i. and the injection rate was one barrel per minute.

The cement was allowed to set for a period of about twelve hours while maintaining a column of diesel oil on the injected cement. Thereafter salt water was injected into the tubing and about forty feet of sand and cement were washed out of the casing. The cement was then drilled out in the customary manner and the well equipped for production. There was recovered from the well between 60–90 barrels per day of sand-free oil. Over a 14 month period the well continued to produce sand-free oil.

EXAMPLE 2

In another field test a well which had been cased with a seven-inch diameter, twenty-six pound casing and which had been perforated at the 7,684 to 7,704 feet intervals were prepared for the test by setting a retrievable bridge plug about 100 feet below the lower perforation. The casing was filled with a gelled mud between the bridge plug and the perforations. The perforations were then washed by setting a Retrievable Test-Treat-Squeeze (RTTS) Packer at 1 foot increments throughout the perforated interval and circulating wash liquid through the perforations. The wash liquid consisted of salt water and then approximately 500 gallons of conventional mud acid. After the acid had been circulated and removed the RTTS tool was picked up about 180 feet above the upper perforation. Then 20 barrels of diesel oil were pumped into the tubing with a circulating pressure of about 1000 p.s.i. at a pump rate of about 2 barrels per minute. The RTTS tool was then set and a diesel oil suspension of the cement slurry used in Example 1 was injected into the formation at a rate of about 2 barrels per minute. The initial injection pressure was about 3300 p.s.i. and the initial solids content of the diesel oil suspension was about 2.7 lbs. of the permeable cement slurry per gallon of diesel oil carrier medium. The solids content of the diesel oil suspension carrier fluid was decreased to about one pound per gallon as the treatment progressed. After about 120 barrels of the suspension had been injected into the formation the pressure rose to about 4800 p.s.i. Approximately 3000 lbs. of the permeable cement solids had been squeezed into the formation during the period. From 400 to 600 pounds of the permeable cement were additionally injected into the formation at a pressure of about 3300 p.s.i. and at a rate of about 0.25 barrel of slurry suspension per minute. A total of about 3500 lbs. of the permeable cement were injected into the formation. An eight hour waiting-on cement period was observed and then the soft cement and sand remaining in the casing were washed out in the usual manner using a salt water wash liquid. Then the well was subsequently put on production. It produced 60–90 barrels of sand-free oil. After eleven months on production, the well still was producing sand-free oil.

EXAMPLE 3

Another field test was carried out on a new well which was in a field that had a history of sand production. The well was prepared for tests by setting the RTTS tool above the perforations in the casing which were at the 3,790–3,793 feet intervals and permitting the well to produce until it had sanded up. The sand was reversed out of the tubing and casing to a depth of 3,769 feet. The perforations were then washed out by circulating a salt water wash liquid around the tool which had been set in the center of the perforated interval. The wash liquid was continued until the well was clean and the RTTS tool was picked up about 180 feet above the upper perforations. There was pumped 22 barrels of diesel oil into the tubing and the tool was set.

A permeable cement slurry having the composition of Example 1 was prepared. The slurry was mixed with diesel oil carrier fluid in an amount of 1 pound per gallon of oil.

The diesel oil suspension of the cement slurry was pumped into the formation at an injection pressure of about 1700 p.s.i. and a rate of about 1.3 barrels per minute and a solids content of about 1 pound of the slurry per gallon of the oil. After injection of about 6 barrels of the suspension (260 pounds of the cement slurry) into the perforations the pressure rose from 1700 to 2500 p.s.i. and then decreased to about 1900 p.s.i. and remained at about 1900 p.s.i. until about 88 barrels of the slurry suspension were injected into the tubing. It was determined that about 2400 pounds of the solids had been squeezed into the perforations and about 27 barrels of the suspension remained in the tubing and the casing. Pumping was then discontinued for three periods of about 15 to 30 minutes each to allow some settling of the suspension solids. The pressure decreased to about 1600 p.s.i. during these periods. A final squeeze pressure of 2100 p.s.i. was attained. It was determined that a total of about 3500 pounds of sand-cement slurry was squeezed into the formation. After 8 hours waiting-on cement the soft cement and sand in the casing were washed out and subsequently the well was equipped for production. It was found that the well flowed on a No. 30 choke and a tubing pressure of 250 p.s.i. and made 97 barrels of sand-free oil per day. After ten months on production the well was essentially sand free.

EXAMPLE 4

In another field trial a well which had been perforated at the 5,116–5,120 feet intervals with four shots per foot in the 4.5 inch–9.5 pound casing was prepared for the test. The test preparation consisting of running the RTTS tool with a one foot stinger to 5,090 feet. The tool was set and the well was produced until it sanded up. Sand in the tubing was then reversed out and the tool used to tag bottom at 5,219 feet. An attempt was made to wash the perforations by setting the RTTS tool in the perforated interval using a salt water wash liquid but the formation was taking too much water for effective washing. The tool was then pulled up about 10 feet abovet the upper perforation and 7.5 sacks of gravel were poured down the tubing to bring the bottom to a level of about 5,121 feet. The RTTS tool was picked up 180 feet above the perforations and 10 barrels of diesel oil were pumped into the tubing. The RTTS tool was then set and 30 barrels of a diesel oil suspension of the permeable cement mixture of Example 1 were pumped through the tubing. The pumping rate was about 1 barrel per minute and this suspension contained about 1.5 pounds per gallon of the sand-water-cement mixture. Pumping was stopped when the pressure reached 300 p.s.i. In all about 13 cubic feet of the permeable cement were injected into the formation.

After a twelve hour period of waiting-on cement, the RTTS tool was used to tag sand at 5,031 feet and to wash to hard cement at 5,055 feet. The RTTS tool was pulled and a rock bit used to drill to 5,118 feet. The well was then equipped for production and the first production gauge was 43 barrels gross, 13 barrels net, gas lifting sand-free fluids from 4,600 feet. Production of sand-free oil continued for an additional 14-day period when direct observations were discontinued. At the end of the test period the well was producing 60 barrels gross, 59 barrels net of sand-free oil and has continued at this rate for an additional thirteen month period.

EXAMPLE 5

In a laboratory test 200 grams of 20–40 mesh frac sand were admixed with 40 grams of Trinity Lite Wate Cement. Water in an amount of 32 ml. was added to wet the solid mixture and then into the resultant slurry there was added kerosene in an amount of 1000 ml. The resultant suspension of solids in kerosene was then pumped at a pressure of 20–50 p.s.i. into a sand packed pipe which measured 3 inches in diameter and 6 inches in length which was about ½ full of sand of a type that is typically found in an underground formation. The solids were deposited on the surface of the sand while the liquid portion thereof passed through the sand in the pipe. The cement hardened and the permeability of the hardened cement was determined. It was found to be about 10 darcies. The sand was about 70–300 mesh size having a permeability of about 10 darcies. The suspension pump rate was about 1 gallon per minute. In all about 200 grams of solids were passed into the pipe.

Obviously, many modifications and variations of the invention as hereinbefore set forth may be made without departing from the spirit and scope thereof, and therefore only such limitations should be made as are indicated in the appended claims.

I claim:
1. A method of treating an incompetent formation penetrated by a well bore to prevent the movement of unconsolidated sand particles from said incompetent formation to the well bore as formation fluids are recovered from said formation which comprises forming a slurry consisting essentially of sand having a particle size between 10 and 80 mesh, cement and sufficient water to wet the sand and cement particles, suspending the sand and cement wetted particles in a hydrocarbon carrier oil fraction, injecting said suspension against the unconsolidated formation at a pressure sufficient to permit the carrier medium to be forced into the unconsolidated formation, permitting the cement to set to form a permeable cement barrier film between the formation and the well bore and thereafter recovering fluids from the unconsolidated formation by passage through the formed permeable cement barrier.

2. A method as claimed in claim 1 wherein the slurry consists essentially of from 3 to 12 parts by weight of sand particles having a mesh size of from about 10 mesh to about 80 mesh per part by weight of cement and wherein the size of the largest grains is not more than about twice the diameter of the smallest grains and wherein the amount of water present in said slurry is from about 0.7 to about 0.95 part by weight per part by weight of cement.

3. A method as claimed in claim 1 wherein the slurry is suspended in the hydrocarbon oil in an amount of from about 0.5 to 5 pounds of the slurry per gallon of the hydrocarbon oil.

4. A method as claimed in claim 1 wherein the hydrocarbon oil is a kerosene fraction.

5. A method as claimed in claim 1 wherein the hydrocarbon oil is a diesel oil fraction.

6. A method as claimed in claim 1 wherein the hydrocarbon oil is a light crude oil.

7. A method as claimed in claim 1 wherein prior to injecting the suspended slurry against the unconsolidated formation, the unconsolidated formation is washed with salt water to remove at least a portion of the unconsolidate sand particles adjacent to the well bore.

8. A cement slurry suspended in a hydrocarbon oil fraction for use in forming a permeable cement barrier in the bore hole adjacent to an unconsolidated sand-containing oil producing formation which consists essentially of from about 3 to about 12 parts by weight of sand particles having an average mesh size of from about 10 mesh to about 80 mesh, from about 0.7 to about 0.95 part by weight of water, each per part by weight of cement, and wherein said suspension contains from about 0.5 to 5 pounds of said slurry per gallon of the hydrocarbon oil fraction.

9. A cement slurry as claimed in claim 8 wherein the water component contains a salt selected from the group consisting of a chloride of sodium, calcium and mixtures thereof in an amount approaching saturation at ambient temperature when the hydrocarbon oil fraction contains naphthenic acids in an amount sufficient to impart to said oil a neutralization number of from 0.4 to 1.0.

References Cited

UNITED STATES PATENTS

| | | | |
|---|---|---|---|
| 2,801,931 | 8/1957 | Morgan et al. | 166—31 X |
| 2,801,984 | 8/1957 | Morgan et al. | 166—33 X |
| 2,823,753 | 2/1958 | Henderson et al. | 166—33 X |
| 2,878,875 | 3/1959 | Dunlap et al. | 166—31 |
| 2,900,027 | 8/1959 | Cooper | 166—33 |
| 3,071,481 | 1/1963 | Beach et al. | 166—31 X |
| 3,119,448 | 1/1964 | Rhoades | 166—29 X |
| 3,145,774 | 8/1964 | Patchen | 166—31 |
| 3,146,829 | 9/1964 | Mann | 166—29 X |
| 3,219,110 | 11/1965 | Martin et al. | 166—29 X |
| 3,291,214 | 12/1966 | Hower | 166—29 |

STEPHEN J. NOVOSAD, Primary Examiner.

U.S. Cl. X.R.

106—90, 98; 166—293